United States Patent
Roberge et al.

(10) Patent No.: US 10,145,245 B2
(45) Date of Patent: Dec. 4, 2018

(54) BONDED MULTI-PIECE GAS TURBINE ENGINE COMPONENT

(71) Applicant: United Technologies Corporation, Hartford, CT (US)

(72) Inventors: Gary Roberge, Tolland, CT (US); Grant O. Cook, III, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 332 days.

(21) Appl. No.: 15/023,715

(22) PCT Filed: Sep. 8, 2014

(86) PCT No.: PCT/US2014/054454
§ 371 (c)(1),
(2) Date: Mar. 22, 2016

(87) PCT Pub. No.: WO2015/047698
PCT Pub. Date: Apr. 2, 2015

(65) Prior Publication Data
US 2016/0215627 A1 Jul. 28, 2016

Related U.S. Application Data

(60) Provisional application No. 61/881,618, filed on Sep. 24, 2013.

(51) Int. Cl.
*F01D 5/18* (2006.01)
*F01D 5/14* (2006.01)
(Continued)

(52) U.S. Cl.
CPC .......... *F01D 5/147* (2013.01); *B23K 1/0018* (2013.01); *B23K 20/02* (2013.01); *B32B 37/12* (2013.01);
(Continued)

(58) Field of Classification Search
CPC .......... F01D 5/186; F01D 5/187; F01D 5/147; B23P 15/04
See application file for complete search history.

(56) References Cited

U.S. PATENT DOCUMENTS 3,628,226 A 12/1971 Nelson
4,183,716 A 1/1980 Takahara et al.
(Continued)

FOREIGN PATENT DOCUMENTS

EP 1347151 9/2003
GB 2077363 12/1981
(Continued)

OTHER PUBLICATIONS

Supplementary European Search Report for European Patent Application No. 14847036.2 completed May 3, 2017.
(Continued)

*Primary Examiner* — Jason Shanske
*Assistant Examiner* — Behnoush Haghighian
(74) *Attorney, Agent, or Firm* — Carlson, Gaskey & Olds, P.C.

(57) ABSTRACT

A component includes a component body that is configured for use in a gas turbine engine. The component body includes first and second structural segments that are bonded to each other in at least one diffusion joint. The first and second structural segments are formed of, respectively, first and second materials. The first and second materials are different base-metal alloys, a metallic alloy and a ceramic-based material, or ceramic-based materials that differ by at least one of composition and microstructure.

18 Claims, 4 Drawing Sheets

(51) Int. Cl.

| | | |
|---|---|---|
| *F01D 5/28* | (2006.01) | |
| *B23K 1/00* | (2006.01) | |
| *B23K 20/02* | (2006.01) | |
| *B32B 37/12* | (2006.01) | |
| *B23P 15/04* | (2006.01) | |
| *B23K 101/00* | (2006.01) | |
| *B23K 103/18* | (2006.01) | |
| *B23K 103/08* | (2006.01) | |
| *B23K 103/00* | (2006.01) | |

(52) U.S. Cl.
CPC ............ *F01D 5/186* (2013.01); *F01D 5/187* (2013.01); *F01D 5/189* (2013.01); *F01D 5/284* (2013.01); *B23K 2201/001* (2013.01); *B23K 2203/08* (2013.01); *B23K 2203/18* (2013.01); *B23K 2203/26* (2015.10); *B23K 2203/52* (2015.10); *B23P 15/04* (2013.01); *B32B 2311/00* (2013.01); *B32B 2315/02* (2013.01); *F05D 2220/32* (2013.01); *F05D 2230/236* (2013.01); *F05D 2230/60* (2013.01); *F05D 2260/202* (2013.01); *F05D 2300/131* (2013.01); *F05D 2300/222* (2013.01); *F05D 2300/228* (2013.01); *F05D 2300/608* (2013.01); *Y02T 50/672* (2013.01); *Y02T 50/673* (2013.01); *Y02T 50/676* (2013.01)

(56) References Cited

U.S. PATENT DOCUMENTS

| | | | |
|---|---|---|---|
| 4,375,233 A | 3/1983 | Rossmann et al. | |
| 5,372,298 A | 12/1994 | Glaeser | |
| 5,836,075 A | 11/1998 | Fitzgerald et al. | |
| 6,003,756 A * | 12/1999 | Rhodes | B22C 7/00 144/346 |
| 6,325,871 B1 * | 12/2001 | Burke | B23K 20/023 148/522 |
| 6,508,000 B2 | 1/2003 | Burke et al. | |
| 6,726,444 B2 * | 4/2004 | Zhao | F01D 5/14 415/115 |
| 7,080,971 B2 * | 7/2006 | Wilson | F01D 5/147 416/92 |
| 7,189,064 B2 | 3/2007 | Helder et al. | |
| 7,565,996 B2 | 7/2009 | Das | |
| 8,231,354 B2 | 7/2012 | Campbell et al. | |
| 8,956,700 B2 * | 2/2015 | Taxacher | C23C 4/02 427/307 |
| 9,897,098 B2 * | 2/2018 | Hill | F04D 29/083 |
| 2002/0012587 A1 | 1/2002 | Farrar et al. | |
| 2010/0054930 A1 * | 3/2010 | Morrison | B22D 19/04 415/191 |
| 2011/0110772 A1 * | 5/2011 | Arrell | B23P 15/04 415/177 |
| 2012/0244383 A1 * | 9/2012 | Meschter | C04B 41/009 428/633 |
| 2013/0167555 A1 | 7/2013 | Schwarz et al. | |
| 2013/0195674 A1 * | 8/2013 | Watson | B21D 53/88 416/241 R |
| 2013/0331923 A1 * | 12/2013 | Koester | A61N 1/3754 607/137 |

FOREIGN PATENT DOCUMENTS

| | | | | |
|---|---|---|---|---|
| GB | 2077363 A * | 12/1981 | ............ | F01D 5/184 |
| GB | 2518335 | 3/2015 | | |
| GB | 2518335 A * | 3/2015 | ............ | F01D 5/147 |
| JP | 2013164067 | 8/2013 | | |
| WO | 9933605 | 7/1999 | | |
| WO | 2015/031106 | 3/2015 | | |

OTHER PUBLICATIONS

International Preliminary Report on Patentability for PCT Application No. PCT/US2014/054454 completed on Mar. 29, 2016.
International Search Report for PCT Application No. PCT/US2014/054454 completed Dec. 15, 2014.
MacDonald, W.D. and Eagar, T.W. (1992). Transient liquid phase bonding. Annual Review of Material Science. 1992. 22:23-46.
Cook, G.O., III and Sorensen, C.D. (2011). Overview of transient liquid phase and partial transient liquid phase bonding. Journal of Material Science (2011). 46:5305-5323.

* cited by examiner

BONDED MULTI-PIECE GAS TURBINE ENGINE COMPONENT

CROSS-REFERENCE TO RELATED APPLICATION

This application claims priority to U.S. Provisional Application No. 61/881,618, filed Sep. 24, 2013.

BACKGROUND

A turbomachine, such as a gas turbine engine, typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and, optionally, a fan section if the turbomachine is used as a propulsor.

The turbine section, as well as the compressor section, typically includes airfoils. Some airfoils rotate as blades and other airfoils are static vanes. Depending on the operating conditions, the airfoils are fabricated of a metal alloy, such as a nickel-based alloy. The airfoils can be cast in a desired design geometry from the selected metal alloy. Depending on the operating conditions, the airfoils may include a coating on the outside to protect the airfoil from thermal, environmental or other conditions.

SUMMARY

A gas turbine engine component according to an example of the present disclosure includes a component body configured for use in a gas turbine engine. The component body includes first and second structural segments that are bonded to each other in at least one diffusion joint. The first and second structural segments are formed of, respectively, first and second materials, wherein the first and second materials are different base-metal alloys, a metallic alloy and a ceramic-based material, or ceramic-based materials that differ by at least one of composition and microstructure.

In a further embodiment of any of the foregoing embodiments, the first and second materials are the different base-metal alloys.

In a further embodiment of any of the foregoing embodiments, the base-metal alloy of the first material is a nickel-based or cobalt-based alloy, and the base-metal alloy of the second material is a molybdenum-based alloy.

In a further embodiment of any of the foregoing embodiments, one of the different base-metal alloys is an aluminum-based alloy.

In a further embodiment of any of the foregoing embodiments, the first and second materials are, respectively, the metallic alloy and the ceramic-based material.

In a further embodiment of any of the foregoing embodiments, the metallic alloy is a molybdenum-based alloy.

In a further embodiment of any of the foregoing embodiments, the first and second materials are the ceramic-based materials that differ by at least one of composition and microstructure.

In a further embodiment of any of the foregoing embodiments, at least one of the first and second structural segments is monolithic.

In a further embodiment of any of the foregoing embodiments, one of the ceramic-based materials is a silicide.

In a further embodiment of any of the foregoing embodiments, one of the ceramic-based materials is silicon nitride.

A gas turbine engine component according to an example of the present disclosure includes an airfoil including first and second structural airfoil segments that are bonded to each other in at least one diffusion joint. The first and second structural airfoil segments are formed of, respectively, first and second materials, wherein the first and second materials are different base-metal metallic alloys, a metallic alloy and a ceramic-based material, or ceramic-based materials that differ by at least one of composition and microstructure.

In a further embodiment of any of the foregoing embodiments, the at least one diffusion joint includes a plurality of diffusion joints that lie along a curved mid-plane between a convex side of the airfoil and a concave side of the airfoil.

In a further embodiment of any of the foregoing embodiments, each of the first and second structural airfoil segments includes a respective wall having an exterior surface and an opposed, interior surface, with a plurality of ribs extending from the interior surface.

In a further embodiment of any of the foregoing embodiments, the first structural airfoil segment is a skin and the second structural airfoil segment is a spar structure.

In a further embodiment of any of the foregoing embodiments, the skin includes a wall having an external surface and an opposed, interior surface, with a plurality of spaced-apart protrusions extending from the interior surface, and free ends of the plurality of spaced-apart protrusions are bonded to the spar structure in diffusion joints.

In a further embodiment of any of the foregoing embodiments, the airfoil extends radially between a radially-inner base and a radially-outer free tip end, and the second structural airfoil segment is a core spar structure, and further including a third structural airfoil segment that is also bonded to the second structural airfoil segment in at least one diffusion joint, the first structural airfoil segment and the second structural airfoil segment being radially stacked.

A further embodiment of any of the foregoing embodiments includes an expansion gap between the first structural airfoil segment and the third structural airfoil segment.

A further embodiment of any of the foregoing embodiments includes an overlapping expansion joint between the first structural airfoil segment and the third structural airfoil segment.

In a further embodiment of any of the foregoing embodiments, the at least one diffusion joint is at a leading edge of the airfoil and includes a slot there through, the at least one diffusion joint at the leading edge coinciding in location with a stagnation point of the leading edge.

A method for fabricating a gas turbine engine component according to an example of the present disclosure includes forming a component body configured for use in a gas turbine engine by bonding first and second structural segments together in at least one diffusion joint. The first and second structural segments being formed of, respectively, first and second materials, wherein the first and second materials are different base-metal alloys, a metallic alloy and a ceramic-based material, or ceramic-based materials that differ by at least one of composition and microstructure.

In a further embodiment of any of the foregoing embodiments, the bonding is transient liquid phase bonding or partial transient liquid phase bonding.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 5 illustrates segments of a gas turbine component having radial expansion gaps there between.

FIG. 6 illustrates segments of another example gas turbine engine component having overlapping expansion joints there between.

DETAILED DESCRIPTION

Figure 1:
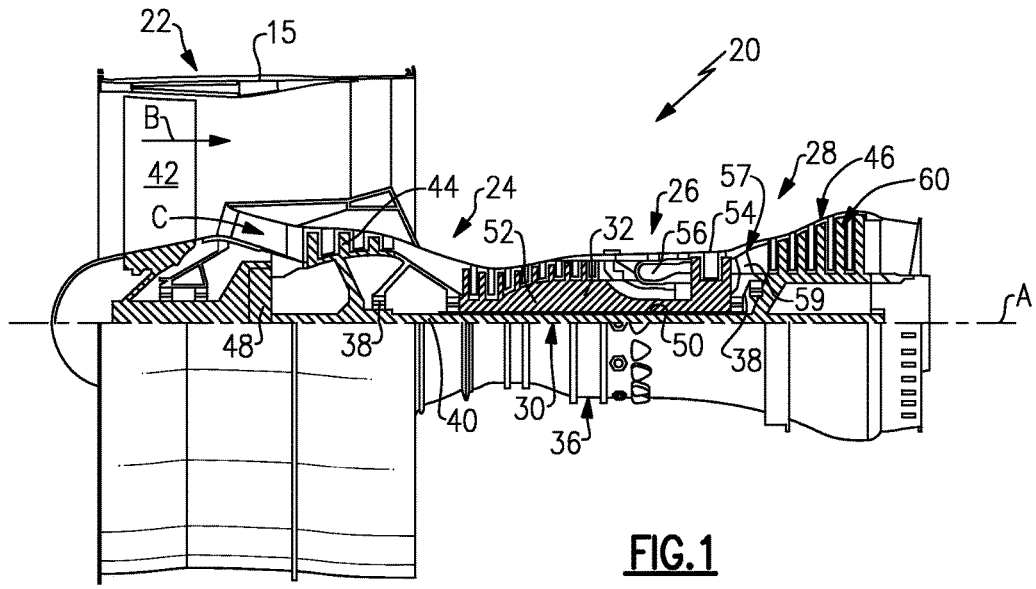
FIG. 1 illustrates an example gas turbine engine.

FIG. 1 schematically illustrates a gas turbine engine 20. The gas turbine engine 20 is disclosed herein as a two-spool turbofan that incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it is to be understood that the concepts described herein are not limited to use with two-spool turbofans and the teachings can be applied to other types of turbine engines or turbomachines, including three-spool architectures and ground-based engines.

The engine 20 includes a low-speed spool 30 and a high-speed spool 32 mounted for rotation about an engine central axis A relative to an engine static structure 36 via several bearing systems, shown at 38. It is to be understood that various bearing systems at various locations may alternatively or additionally be provided, and the location of bearing systems may be varied as appropriate to the application.

The low-speed spool 30 includes an inner shaft 40 that interconnects a fan 42, a low-pressure compressor 44 and a low-pressure turbine 46. The inner shaft 40 is connected to the fan 42 through a speed-change mechanism, which in this example is a gear system 48, to drive the fan 42 at a lower speed than the low-speed spool 30. The high-speed spool 32 includes an outer shaft 50 that interconnects a high-pressure compressor 52 and high-pressure turbine 54.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A combustor 56 is arranged between the high-pressure compressor 52 and the high-pressure turbine 54. A mid-turbine frame 57 of the engine static structure 36 is arranged between the high-pressure turbine 54 and the low-pressure turbine 46. The mid-turbine frame 57 further supports bearing system 38 in the turbine section 28. The inner shaft 40 and the outer shaft 50 are concentric and rotate via, for example, bearing systems 38 about the engine central axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 57 includes airfoils 59 which are in the core airflow path C. The turbines 46, 54 rotationally drive the respective low-speed spool 30 and high-speed spool 32 in response to the expansion. It will be appreciated that each of the positions of the fan section 22, compressor section 24, combustor section 26, turbine section 28, and gear system 48 can be varied. For example, gear system 48 may be located aft of combustor section 26 or even aft of turbine section 28, and fan section 22 may be positioned forward or aft of the location of gear system 48.

The engine 20 in one example is a high-bypass geared engine. In a further example, the engine 20 has a bypass ratio that is greater than about six (6), with an example embodiment being greater than about ten (10), the gear system 48 is an epicyclic gear train, such as a planet or star gear system, with a gear reduction ratio of greater than about 2.3, and the low-pressure turbine 46 has a pressure ratio that is greater than about five (5). In one disclosed embodiment, the bypass ratio is greater than about ten (10:1), the fan diameter is significantly larger than that of the low-pressure compressor 44, and the low-pressure turbine 46 has a pressure ratio that is greater than about five (5). Low pressure turbine 46 pressure ratio is pressure measured prior to inlet of low pressure turbine 46 as related to the pressure at the outlet of the low-pressure turbine 46 prior to an exhaust nozzle. The gear system 48 can be an epicycle gear train, such as a planet or star gear system, with a gear reduction ratio of greater than about 2.3:1. It is to be understood, however, that the above parameters are only exemplary and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry-standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

The fan 42, in one non-limiting embodiment, includes less than about twenty-six fan blades. In another non-limiting embodiment, the fan section 22 includes less than about twenty fan blades. Moreover, in a further example, the low-pressure turbine 46 includes no more than about six turbine rotors. In another non-limiting example, the low-pressure turbine 46 includes about three turbine rotors. A ratio between the number of fan blades and the number of low-pressure turbine rotors is between about 3.3 and about 8.6. The example low-pressure turbine 46 provides the driving power to rotate the fan section 22 and therefore the relationship between the number of turbine rotors 34 in the low-pressure turbine 46 and the number of blades in the fan section 22 disclose an example gas turbine engine 20 with increased power transfer efficiency.

The engine 20 can include one or more components that are configured for use in one of the above-described sections of the engine 20. Such components can be formed from metallic alloys, ceramic materials or combinations thereof. Described herein are components that are formed of first and second structural segments that are bonded to each other in at least one diffusion joint. A diffusion joint is a joint that is formed by, and has physical characteristics of, a bonding process that is conducted at a temperature that is sufficient to cause diffusion and results in the bonding together of two or more components. In a further example, the diffusion is the primary mechanism by which the bond strength is increased beyond that achieved by localized wetting of the substrates such that, in the absence of the diffusion, the bond strength reaches a ceiling or cap that might not be sufficient for certain applications. A diffusion joint can be formed using brazing, diffusion bonding, transient liquid phase bonding or partial transient liquid phase bonding, but is not limited to such techniques. The segments are formed of, respectively, first and second materials. The first and second materials can be different base-metal alloys, a metallic alloy and a ceramic-based material, or ceramic-based materials that differ by at least one of composition and microstructure.

As used herein, a "structural segment" is a self-supporting body that does not rely upon conformance with an underlying substrate for support. Further, the term "composition" refers to a representative chemical formulation of atoms of a material. Compositions that include common elements are considered different if the numbers of atoms of that element differ in the chemical formulation. Similarly, materials that include common elements with the same number of atoms of a common element in the chemical formulations are considered different if the microstructural arrangement of the common element atoms with respect to other element atoms in the chemical formulation differ. Microstructure refers to observable or detectable features of a phase or region of a material. For example, microstructures can differ by crystalline arrangements of atoms, the presence or absence of crystalline phases in the material, the geometry of phases or structures in the material or the like. A base metal in an alloy is the metal element that is most abundant by weight in the alloy composition.

Figure 2:
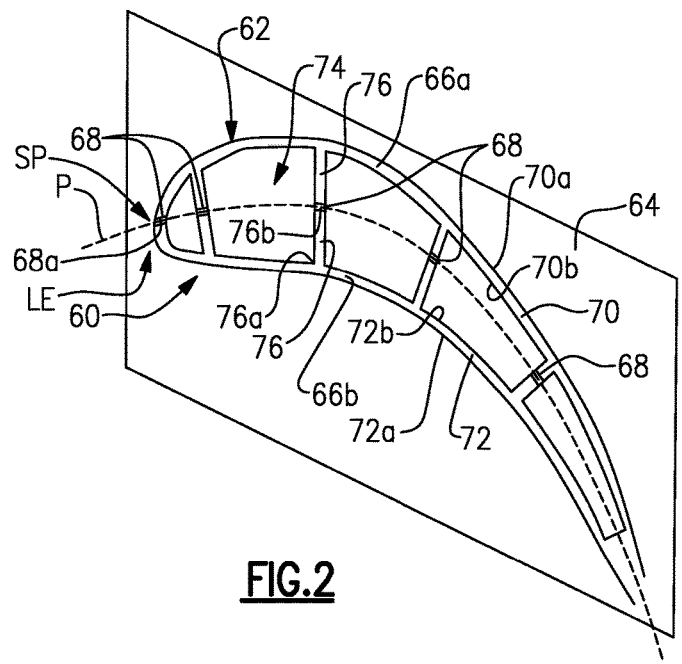
FIG. 2 illustrates an example gas turbine engine component of the engine of FIG. 1.

FIG. 2 shows selected portions of a component 60 according to the above description. In this example, the component 60 is a turbine airfoil mounted in the turbine section 28 of the engine 20. Although the examples herein may be described with reference to turbine airfoils, it is to be understood that other airfoils in the engine 20, such as compressor airfoils or fan airfoils, will also benefit from this disclosure. Similarly, other components in the engine 20 can also benefit from the examples herein, such as, but not limited to, blade outer air seals.

In this example, the component 60 includes an airfoil 62. The airfoil 62 extends radially outwardly, relative to central engine axis A, from a platform 64. The airfoil 62 has an aerodynamic, wing-like shape that provides a lift force via Bernoulli's principle such that suction and pressure are produced on opposing sides of the airfoil 62. The airfoil 62 has been sectioned in the illustration to reveal its structure, for the purposes of description.

The airfoil 62 includes a first structural airfoil segment 66a and a second structural airfoil segment 66b that are bonded to each other in at least one diffusion joint 68. In this particular example, the segments 66a/66b are bonded in five such diffusion joints 68, although an additional diffusion joint 68 can be included at the trailing edge. It is to be understood that fewer or additional diffusion joints 68 can be used in other implementations. In other implementations that are not airfoils, the first structural airfoil segment 66a and a second structural airfoil segment 66b would simply be first and second structural segments, and would not necessarily have, or relate to, an airfoil shape. In one further example, the diffusion joint 68 at the leading edge (LE) of the airfoil 62 can be located at a stagnation point SP of LE flow around the airfoil 68. A slot 68a can be provided at the diffusion joint 68 to facilitate cooling at the location of the stagnation point SP. For example, the slot 68a can be a radial slot.

The first structural airfoil segment 66a includes a wall 70 having an exterior side 70a and an interior side 70b. Similarly, the second structural airfoil segment 66b also has a wall 72 with an exterior side 72a and an interior side 72b. The exterior sides 70a/72a, the interior sides 70b/72b, or both can be coated, either before or after bonding, with a protective coating system, which can be, but is not limited to, single- or multi-layer thermal or environmental coating systems. For example, the interior sides 70b/72b are coated prior to bonding because access to the interior sides 70b/72b is easier. The interior sides 70b/72b bound or partially bound one or more interior cavities 74 within the airfoil 62. Each of the walls 70/72 includes a plurality of ribs 76 that extend inwardly from the respective interior sides 70b/72b. Each rib 76 extends between a base 76a at the respective wall 70/72 and an end 76b at which the rib 76 is bonded to a corresponding rib 76. Thus, prior to bonding the segments 66a/66b together to form the diffusion joints, the ends 76b are free ends. Additionally, either or both of the walls 70/72 can includes one or more film cooling holes (not shown), which can be formed either before or after bonding.

In this example, the diffusion joints 68 are arranged such that they lie along a curved mid-plane, P, of the airfoil 62, which could be a mean camber line of the airfoil 62, for example. In further examples, the diffusion joints 68 can be arranged along a different curved mid-plane than shown in the illustration, or another shape including one or more flat sections.

The segments 66a/66b can be individually fabricated and then bonded together to form the diffusion joints 68. Thus, the airfoil 62 is a multi-piece component. As can be appreciated, the segments 66a/66b could be further segmented into sub-segments that are bonded together and eventually bonded to each other. In some examples, the segmentation of the multi-piece design can permit the incorporation of relatively complex design features that might not be otherwise available in single-piece designs. Such features can be formed in either of the segments 66a/66b by casting, machining, etching, additive manufacturing, or other suitable process. The features can include, for example only, cooling passages/circuits, features that facilitate heat transfer, coatings, and combinations thereof. Additionally, the segmentation of the multi-piece design permits the selection of different materials based upon the localized operating conditions of the segments 66a/66b and, optionally, also material costs, fabrication, and source considerations, as well as the selection of material combinations that otherwise could not be used to form hollow or complex geometry structures.

Figures 3A, 3B:
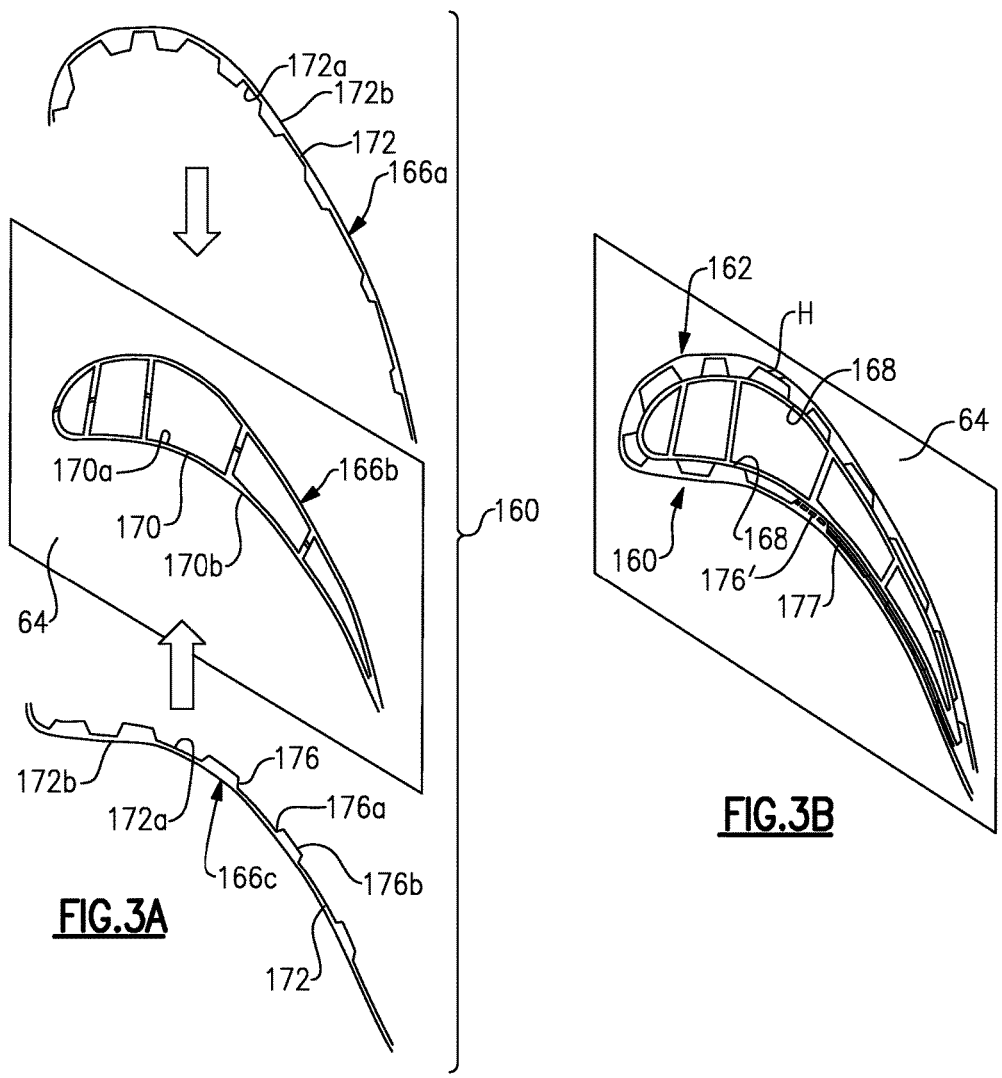
FIG. 3A illustrates an exploded view of another example gas turbine engine component.
FIG. 3B illustrates the gas turbine engine component of FIG. 3A in a final, assembled state.

FIG. 3A shows an expanded view of another example component 160 prior to diffusion bonding, and FIG. 3B shows the component 160 in a final state after diffusion bonding. In this disclosure, like reference numerals designate like elements where appropriate and reference numerals with the addition of one-hundred or multiples thereof designate modified elements that incorporate the same features and benefits of the corresponding elements, unless described otherwise. In this example, the component 160 is also a turbine airfoil that can be used in the turbine section 28 of the engine 20. The component 160 includes an airfoil 162 that is a multi-piece, bonded assembly of a first structural airfoil segment 166a, a second structural airfoil segment 166b, and a third structural airfoil segment 166c. Here, the second structural airfoil segment 166b serves as a core and the first structural airfoil segment 166a and the third structural airfoil segment 166c serve as skins that are bonded to and sandwich the core In this example, the second structural airfoil segment 166b is a spar structure to which the skins are bonded. The spar structure includes rib-reinforced walls, but is not limited to the arrangement of ribs and walls shown. The spar structure of the second structural airfoil segment 166b can be similar to that shown in FIG. 2 or, alternatively, can be a monolithic piece. In further examples, rather than a spar structure, the core could be a hollow structure, a solid body or combinations thereof. The hollow or spar structure can provide internal passages for cooling, if desired.

The second structural airfoil segment 166b has an airfoil shape defined by a wall 170. The wall 170 has an interior surface 170a and an exterior surface 170b. The skins are bonded to the exterior surface 170b.

Each of the skins includes a respective wall 172 that has an interior surface 172a and an exterior surface 172b. The exterior surface 172b of the first structural airfoil segment 166a is convex and serves as a suction side in operation. The exterior surface 172b of the third structural airfoil segment 166c is concave and serves as a pressure side in operation.

A plurality of spaced-apart protrusions 176 extends from each of the interior surfaces 172a. In this example, the protrusions 176 have a trapezoidal shape, although other shapes can alternatively be used. Each of the protrusions 176 extends between a base 176a at the wall 172 and a tip end 176b that serves as a bonding surface with the exterior surface 170b of the core. Once bonded, spaces 177 are bounded by adjacent protrusions 176, the interior surface 172a and the exterior surface 170b. The spaces 177 can serve as cooling passages in the airfoil 162. The protrusions, or portions thereof, can be coated with a thermal barrier coating. In further examples, cooling holes, slots or other flow discharging features can also be provided, a representative example of which is shown at H (FIG. 3B). The space between inner wall 172a and outer wall 172b may also contain internal features to augment heat transfer. The protrusions 176 can be locally continuous to provide a local barrier to control local flow and pressure distribution within the spaces 177. In this regard, the protrusions 176 can include slots, a representative slot indicated at 176', or other discontinuities to allow for the communication of flow across protrusions 176 between spaces 177. The slots 176', or other discontinuities, can be radial (perpendicular to axis A), or axial (aligned with axis A), or arranged in other orientations intended to benefit internal heat transfer.

To fabricate the component 160, the first structural airfoil segment 166a and the third structural airfoil segment 166c are brought into proximity of the exterior surface 170b of the second structural airfoil segment 166b. The component 160 is then heated to a bonding temperature to bond the ends 176b of the protrusions 176 to the exterior surface 170b in diffusion joints 168. The ends 176b of the protrusions 176 can be shaped in conformance with the contours of the corresponding mating areas of the exterior surface 170b. In this manner, the ends 176b of the protrusions 176 are in close proximity to, or even contact with, the exterior surface 170b to enable the formation of a strong bond.

Figure 4:
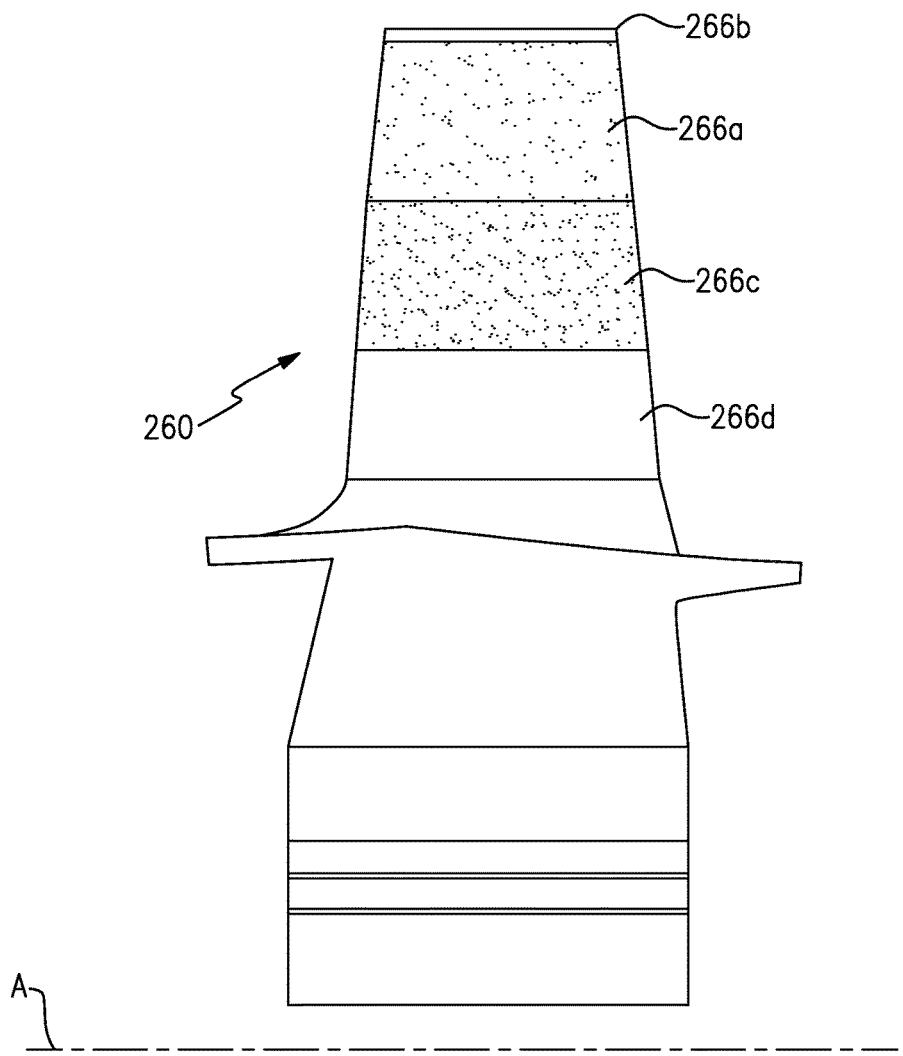
FIG. 4 illustrates another example gas turbine engine component having radial segments.

FIG. 4 shows another example component 260. The component 260 is a turbine blade that can be used in the turbine section 28 of the engine 20. The component 260 is somewhat similar to component 160; however, a first structural airfoil segment 266a and a third structural airfoil segment 266c are radially stacked rather than sandwiching around a core as in the component 160. As can be appreciated, additional structural airfoil segments, such as a fourth structural airfoil segment 266d, can also be used. Thus, the airfoil segments 266a/266c/266d are radially segmented. Each of the segments 266a/266c/266d is bonded, as described with reference to FIGS. 3A and 3B, to the second structural airfoil segment 266b. Neighboring ones of the segments 266a/266c/266d may or may not be bonded to each other. Similar radially stacked segments can be used on the opposed suction or pressure side of the core to sandwich the core in cooperation with segments 266a/266c/266d, similar to the sandwiching described with respect to component 160.

Figure 5:
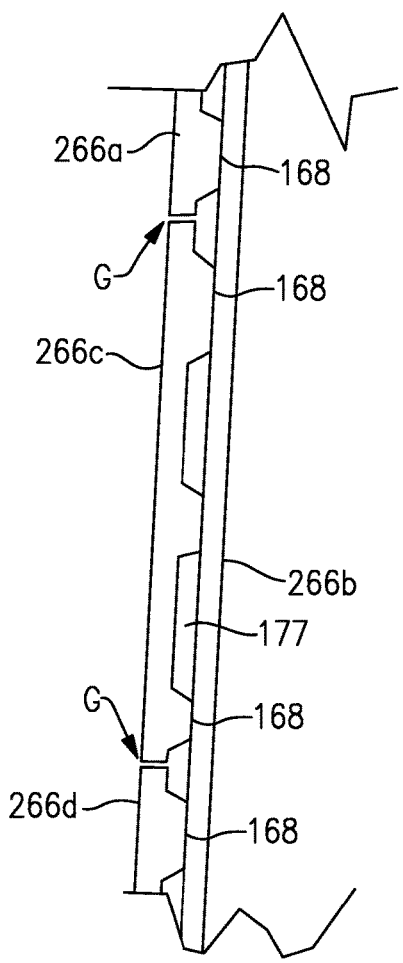

In a further example shown in FIG. 5, the segments 266a/266c/266d are bonded only to the second structural airfoil segment 266b, and not to each other. In this example, there are expansion gaps, G, that extend radially between neighboring ones of the segments 266a/266c/266d. The expansion gaps permit relative thermal expansion/contraction between the segments 266a/266c/266d that can occur from centrifugal or other loading induced strain, radial temperature differentials and/or different materials that are used for each of the segments.

Figure 6:
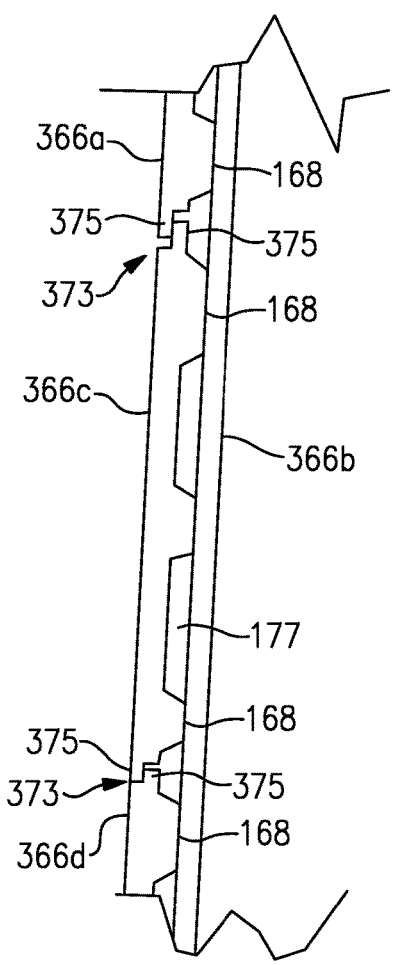

In a modified example shown in FIG. 6, segments 366a/366c/366d are each bonded to a segment 366b. However, in this example, the segments 366a/366c/366d include overlapping expansion joints 373 there between. The overlapping expansion joints 373 include a radial overlap between radially-extending protrusions 375 on neighboring ones of the segments 366a/366c/366d. For example, the protrusion 375 on the upper part of segment 366c overlaps the protrusion 375 on the lower part of segment 366a. The overlapping protrusions 375 may or may not contact each other, but at least sliding contact may be desirable to provide a sealing function to prevent or limit infiltration of hot gases into spaces 177 or prevent or limit loss of cooling fluid from the spaces 177.

As briefly discussed above, the segments of the components described herein are formed of first and second materials. For examples that have additional segments, the additional segments can be formed of the same or different materials as the first and second segments. In this regard, for any two segments that are bonded together, these segments can be formed of different base-metal alloys, a metallic alloy and a ceramic-based material, or ceramic-based materials that differ by at least one of composition and microstructure. The use of multiple segments, formed of different materials, permits localized material selection according to localized conditions of a segment. Thus, a segment that will be exposed to particularly high temperatures during use of the component compared to other portions of a component can be made of a ceramic material, while segments that will be exposed to lower temperatures or require higher toughness, can be formed of a metallic alloy. Similarly, different base-metal alloys can be used for two or more bonded segments to achieve different properties for each of the segments, depending upon the localized conditions of the segments.

The different base-metal alloys can include, for example only, one alloy that is a nickel-based or cobalt-based alloy and another alloy that is molybdenum-based. In additional examples, at least one of the different base-metal alloys can be an aluminum-based alloy or an aluminum-nickel alloy where the two most abundant elements by weight are nickel and aluminum.

If a metallic alloy and a ceramic-based material are used for two bonded segments, the metallic alloy can be any of the alloys described above and the ceramic-based material can be a monolithic or composite ceramic material. In examples wherein one of the segments is a skin bonded to a core segment, the skin can be a ceramic material and the core a metallic alloy.

Composite ceramic materials can include, but are not limited to, fiber-reinforced ceramic matrix composites. Such composites can include, but are not limited to, silicon carbide fibers, carbon fibers, or other ceramic-based fibers, disposed in a primarily ceramic matrix. Ceramic materials, such as silicides, silicon nitride, and silicon carbide are useful in gas turbine engines, but are not limited to such ceramics. Additionally, a segment that is formed of a metallic alloy can be formed using a process suitable for the selected alloy and geometry of the segment. For example, a segment can be cast or wrought, and can have a microstructure characteristic of a single crystal, directional solidification, or other crystallographic structure.

Additionally, as also briefly discussed above, the examples herein are not limited to airfoils in a turbine section or even airfoil structures. Blade outer air seals can also benefit from the disclosed examples. For example, a blade outer air seal typically includes a plurality of circumferential segments that are arranged about a rotor in an engine. For example, blade outer air seals are used around the turbine section 28 in the engine 20. A single blade outer air seal piece is an arc-segment and can include a multi-piece design, similar to as described herein, that include multiple segments that are bonded together. Various passages can be formed in one or more of the bonded segments to permit cooling of the blade outer air seal.

The diffusion joints formed herein can be formed by a process of transient liquid phase (TLP) bonding. TLP bonding is a hybrid of brazing and diffusion bonding processes that avoids the presence of relatively weak or low-melting resultant braze products by utilizing diffusion during the bonding process. In TLP bonding, one or more interlayers are provided in joints between segments that are to be bonded together. The component is then heated at a bonding temperature to melt the interlayer(s), filling any gaps between the segments. Certain alloying elements of the interlayer(s) interdiffuse with the materials of the segments, causing a compositional change in the joint which isothermally solidifies and creates a bond between the two segments. The bonding temperature can be held for an additional period of time to allow more homogenous diffusion. TLP bonding requires little or no pressure to be applied to the segments, compared to diffusion bonding, and thus can mitigate, or avoid, distortion of the segments during the bonding process. The composition of the interlayer(s) can be selected according to the compositions of the materials of the segments that are being bonded together. Thus, the selection of first and second materials for bonded segments can be subject a mutually compatible interlayer or interlayers. Given this description, one of ordinary skill in the art will be able to select an appropriate interlayer or interlayers for the materials of their particular segments.

The diffusion joints formed herein can also be formed by a process of partial transient liquid phase (PTLP) bonding. PTLP bonding is a variation of TLP bonding for joining non-metallic materials. In PTLP bonding, a multi-layer interlayer is provided in joints between segments that are to be bonded together. This multi-layer interlayer can be composed of three layers: a thick refractory layer that does not melt during the process and thinner layers on each side of the thick refractory layer. These layers are can be pure elements, though alloys can be used. The component is then heated at a bonding temperature to melt the thin layers of the multi-layer interlayer. These thin layers diffuse into the thick refractory layer of the interlayer, causing a compositional change in the joint which isothermally solidifies and creates a bond between the two segments. Simultaneously, these thin liquid layers wet (adhere to) the segments. This wetting is brought about by the thin layers' composition(s) or an alloy of the thin layer(s) with the refractory core layer. The bonding temperature can be held for an additional period of time to allow more homogenization of the resulting PTLP bond, further increasing the bond's remelting temperature. PTLP bonding requires little or no pressure to be applied to the segments, compared to diffusion bonding, and thus greatly mitigates, or avoids, distortion of the segments during the process. The composition of the interlayer(s) can be selected according to the compositions of the materials of the segments that are being bonded together. Thus, the selection of first and second materials for bonded segments can be subject a mutually compatible interlayer or interlayers. Given this description, one of ordinary skill in the art will be able to select an appropriate interlayer or interlayers for the materials of their particular segments.

In further examples, TLP bonding can be used to join metallic segments while PTLP bonding can be used to join non-metallic segments. Using TLP (or PTLP) bonding to join a metallic to a non-metallic segment can be termed active TLP bonding and can be achieved using one layer that diffuses into the metallic segment while concomitantly wetting the non-metallic segment. Alternatively, it can be achieved using a multi-layer interlayer (as in PTLP bonding) such that the interlayer material(s) selected for diffusion into the metallic segment does not need to wet the non-metallic segment.

Various bonding material formats can be employed for TLP bonding or PTLP bonding. Suitable bonding material formats can include, but are not limited to, an alloy foil, a foil formed from a pure metal, multiple layers of elemental foils, or combinations thereof. Other formats such as, but not limited to, powder, powder compact, braze paste, or one or more metallic layers applied by electroplating, physical vapor deposition, or another suitable metal deposition process, may also be used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine component comprising: an airfoil including first and second structural airfoil segments that are bonded to each other in at least one first diffusion joint, the first and second structural airfoil segments being formed of, respectively, first and second materials, wherein the first and second materials are: different base-metal metallic alloys, a metallic alloy and a ceramic-based material, or ceramic-based materials that differ by at least one of composition and microstructure, wherein the airfoil extends radially between a radially inner base and a radially outer free tip end, and the second structural airfoil segment is a core spar structure, and further including a third structural airfoil segment that is also bonded to the second structural airfoil segment in at least one second diffusion joint, the first structural airfoil segment and the third structural airfoil segment being radially stacked, and there being an expansion gap between the first structural airfoil segment and the third structural airfoil segment.

2. The gas turbine engine component as recited in claim 1 wherein the first and second materials are the different base-metal metallic alloys.

3. The gas turbine engine component as recited in claim 2, wherein the base-metal metallic alloy of the first material is a nickel-based or cobalt-based alloy, and the base-metal metallic alloy of the second material is a molybdenum-based alloy.

4. The gas turbine engine component as recited in claim 2, wherein one of the different base-metal metallic alloys is an aluminum-based alloy.

5. The gas turbine engine component as recited in claim 1, wherein the first and second materials are, respectively, the metallic alloy and the ceramic-based material.

6. The gas turbine engine component as recited in claim 5, wherein the metallic alloy is a molybdenum-based alloy.

7. The gas turbine engine component as recited in claim 1, wherein the first and second materials are the ceramic-based materials that differ by at least one of composition and microstructure.

8. The gas turbine engine component as recited in claim 7, wherein at least one of the first and second structural segments is monolithic.

9. The gas turbine engine component as recited in claim 7, wherein one of the ceramic-based materials is a silicide.

10. The gas turbine engine component as recited in claim 7, wherein one of the ceramic-based materials is silicon nitride.

11. The gas turbine engine component as recited in claim 1, wherein the at least one first diffusion joint includes a plurality of diffusion joints that lie along a curved mid-plane between a convex side of the airfoil and a concave side of the airfoil.

12. The gas turbine engine component as recited in claim 1, wherein each of the first and second structural airfoil segments includes a respective wall having an exterior surface and an opposed, interior surface, with a plurality of ribs extending from the interior surface.

13. The gas turbine engine component as recited in claim 1, wherein the first structural airfoil segment is a skin.

14. The gas turbine engine component as recited in claim 13, wherein the skin includes a wall having an external surface and an opposed, interior surface, with a plurality of spaced-apart protrusions extending from the interior surface, and free ends of the plurality of spaced-apart protrusions are bonded to the spar structure in third diffusion joints.

15. A gas turbine engine component comprising an airfoil including first and second structural airfoil segments that are bonded to each other in at least one first diffusion joint, the first and second structural airfoil segments being formed of, respectively, first and second materials, wherein the first and second materials are: different base-metal metallic alloys, a metallic alloy and a ceramic-based material, or ceramic-based materials that differ by at least one of composition and microstructure, wherein the airfoil extends radially between a radially inner base and a radially outer free tip end, and the second structural airfoil segment is a core spar structure, and further including a third structural airfoil segment that is also bonded to the second structural foil segment in at least one second diffusion joint, the first structural airfoil segment and the third structural airfoil segment being radially stacked, and there being an overlapping expansion joint between the first structural airfoil segment and the third structural airfoil segment.

16. A gas turbine engine component comprising:
an airfoil including first and second structural airfoil segments that are bonded to each other in at least one diffusion joint, the first and second structural airfoil segments being formed of, respectively, first and second materials, wherein the first and second materials are:
different base-metal metallic alloys,
a metallic alloy and a ceramic-based material, or
ceramic-based materials that differ by at least one of composition and microstructure,
wherein the at least one diffusion joint is at a leading edge of the airfoil and includes a slot there through, the at least one diffusion joint at the leading edge coinciding in location with a stagnation point of the leading edge.

17. A method for fabricating a gas turbine engine component, the method comprising: forming an airfoil by bonding first and second structural segments together in at least one first diffusion joint, the first and second structural segments being formed of, respectively, first and second materials, wherein the first and second materials are: different base-metal alloys, a metallic alloy and a ceramic-based material, or ceramic-based materials that differ by at least one of composition and microstructure, wherein the airfoil extends radially between a radially inner base and a radially outer free tip end, and the second structural airfoil segment is a core spar structure, and further including bonding a third structural airfoil segment to the second structural foil segment in at least one second diffusion joint, the first structural airfoil segment and the third structural airfoil segment being radially stacked, and there being an expansion gap between the first structural airfoil segment and the third structural airfoil segment.

18. The method as recited in claim 17, wherein the bonding is transient liquid phase bonding or partial transient liquid phase bonding.

* * * * *